Patented May 15, 1951

2,552,530

UNITED STATES PATENT OFFICE 2,552,530

PROCESS FOR BREAKING PETROLEUM EMULSIONS

Melvin De Groote, St. Louis, Mo., assignor to Petrolite Corporation, Ltd., Wilmington, Del., a corporation of Delaware No Drawing. Application July 28, 1949, Serial No. 107,381

8 Claims. (Cl. 252—344)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical products, compounds, or the like, in various other arts and industries, along with the method for manufacturing said new chemical products or compounds which are of outstanding value in demulsification. See my co-pending application, Serial No. 107,382, filed July 28, 1949.

My invention provides an economical and rapid process for resolving petroleum emulsions of the water-in-oil type that are commonly referred to as "cutoil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

In my co-pending applications, Serial Nos. 104,801, 104,802, 104,803, and 104,804, all filed July 14, 1949, I have described the breaking of petroleum emulsions by means of certain polyol ethers. Said inventions, or invention, described in the aforementioned co-pending applications may, in the broadest aspect, be considered as being concerned with a process for breaking petroleum emulsions of the water-in-oil type characterized by subjecting the emulsion to the action of a demulsifier including high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant.

The present invention is somewhat akin to the aforementioned invention, or inventions, insofar that it involves also a high molal polyol obtained by the action of propylene oxide but containing in addition basic nitrogen atoms. Stated another way, in the present invention the initial material employed, instead of being a carbohydrate as exemplified by mannitol, sorbitol, sorbitan, etc., is a polyamine or an oxyalkylated derivative thereof, such as diethylene triamine, triethylene tetramine, or tetraethylene pentamine, or compounds which bear a simple genetic relationship thereto without any basic change in the structure as, for example, the glycide derivatives of such amines, and ethylene oxide derivatives of such amines, the low molal acyl derivatives of such amines, the low molal alkyl derivatives of such amines, etc. It is also obvious that there is another difference between initial reactants of the present invention and the initial reactants employed as raw materials in the above mentioned co-pending applications, i. e., Serial Nos. 104,801, 104,802, 104,803, and 104,804, all filed July 14, 1949. This difference is the fact that the raw materials herein employed may be reactive towards propylene oxide by virtue of an amino hydrogen atom as distinguished from a labile hydrogen atom attached to an oxygen atom as in the case of sorbitol, sorbitan, etc.

It is also practical to have initial raw materials suitable for use in the instant invention in which the molecular weight is somewhat higher than in the case of the polyhydric alcohol type of material. These differences will become obvious in the subsequent description of the present invention.

Summarizing what has been said, the present invention in its broadest aspect is concerned with a process for breaking petroleum emulsions of the water-in-oil type characterized by subjecting the emulsion to the action of a demulsifier including high molal oxypropylation derivatives of monomeric polyamino compounds with the proviso that (a) the initial polyamino reactant be free from any radical having at least 8 uninterrupted carbon atoms; (b) the initial polyamino reactant have a molecular weight of not over 1800 and at least a plurality of reactive hydrogen atoms; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial polyamino reactant; (j) the polyamino reactant must contain at least one basic nitrogen atom; and (k) the nitrogen atoms are linked by a carbon atom chain.

Reference to "basic nitrogen atom" refers to one which is not attached to a negative group such as aryl or acyl. Phenylethylenediamine or acetylethylenediamine both qualify as polyamines for the purpose of this description.

In the foregoing summarization of the invention in its various aspects and in the claims reference to monomeric is not intended to exclude compounds such as diethylene triamine, triethylene tetramine, or tetraethylene pentamine but is intended to differentiate from linear polymers or dimers, or other higher polymeric types, obtained, for example, by reaction between a dicarboxy acid, such as adipic acid, and tetraethylene pentamine, or the like.

Briefly stated, the present invention is concerned with breaking petroleum emulsions by means of certain polyol ethers of certain hereinafter specified polyamino compounds as exemplified by diethylene triamine, triethylene tetramine, and tetraethylene pentamine. The preparation of such oxypropylation derivatives is described hereinafter in detail. Such ethers are obtained by treating a water-soluble polyamino reactant having a plurality of functional groups (hydrogen atoms attached to oxygen or nitrogen so as to be reactive toward an alkylene oxide) with propylene oxide. A plurality of propylene oxide is used in molal proportion to the polyamino reactant so as to convert the initial water-soluble product into an ultimate resultant which is water-insoluble.

For instance, the herein described resultants, or more correctly products of reaction since they invariably and inevitably represent cogeneric mixtures rather than a single component, when mixed with distilled water so as to give a 5% solution, suspend after a fashion during vigorous agitation but on being allowed to stand in a quiescent stage immediately separate out so that within a short length of time, for instance, within a few minutes to several hours, all or substantially all the big bulk of material has separated from the aqueous solution or suspension. In fact, in the higher stages of oxypropylation the materials obtained seem to go into water at room temperature with considerable difficulty and if the water happens to be warm, for instance, at a temperature of 50°, 60°, or 70° C., the materials are even less soluble. An example of a product difficult to disperse even with vigorous shaking and which, even so, does not stay dispersed, is the resultant obtained by treating one mole of tetraethylene pentamine with 200 moles of propylene oxide. Reference as to solubility is in ordinary cold water at approximately room temperature, for instance, 22.5° C., or thereabouts.

For convenience, what is said hereinafter is divided into three parts. Part 1 is concerned with the description of the polyamino reactants employed, as well as reference to other compounds, products, etc., so there may be a clear line of demarcation between the present invention and what may appear elsewhere. Part 2 is concerned with the preparation of the oxypropylated derivatives, and Part 3 is concerned with the use of an oxypropylated derivative as a demulsifier for petroleum emulsions of the water-in-oil type.

PART 1

In the present invention the initial reactants are characterized by certain features which have been pointed out in some detail previously. Suitable reactants are exemplified by three compounds which have been mentioned previously, that is, diethylene triamine, triethylene tetramine, and tetraethylene pentamine. The higher polyamines in this series are equally satisfactory, such as pentaethylene hexamine, hexaethylene heptamine, heptaethylene octamine, etc. In some instances the carbon atom chain uniting two nitrogen atoms may, itself, be substituted by the presence of a hydroxyl radical or a ketonic oxygen atom, or a methyl radical. It is preferable that the polyamino compound has at least two basic nitrogen atoms and at least 4 reactive hydrogen atoms. As has been stated previously there are any one of a number of compounds derived from polyamines bearing a simple genetic relationship to such amines which are just as satisfactory for use as initial reactants.

For instance, the polyamine can be treated with ethylene oxide, glycide, butylene oxide, methyl glycide, or a combination of such oxyalkylating agents; or such polyamine can be treated with some propylene oxide and one or more of the oxyalkylating agents previously mentioned. Needless to say, if such an amine is treated with propylene oxide at an initial stage, such product need not be considered as the initial reactant but the amine itself may be so considered. One could produce either salts or amides of low molal acids, such as acetic acid, formic acid, hydroxyacetic acid, lactic acid, and the like; or the ultimate final product can be converted into a salt by reaction with these acids, or by reaction with inorganic acids such as hydrochloric acid, sulfuric acid, phosphoric acid, etc. One can introduce readily low molal acyl radicals as stated, or alkyl radicals, by use of conventional alkylating agents such as dimethyl sulfate, etc. Ether radicals can be introduced in the usual manner. However, all such derivatives are characterized by the fact that they still meet all the requirements set forth elsewhere as to water-solubility, presence of reactive hydrogen atoms, presence of basic nitrogen atoms, etc., and thus obviously bear a simple genetic relationship to the initial polyamino compound.

The polyamines are obtained in various manners, such as reaction involving ethylene dichloride, propylene dichloride, butylene dichloride, or the like, with ammonia, or other amines. Note particularly the amines described in the following patents: U. S. Patents Nos. 2,049,467, dated August 4, 1936, to Mnookin; 1,952,008, dated March 20, 1934, to Bruson; 1,951,992, dated March 20, 1934, to Perkins; and 2,291,396, dated July 28, 1942, to Lieber.

Other methods involve hydrogenation procedures. See U. S. Patents Nos. 2,317,757, dated April 27, 1943, to Graf; 2,408,172, dated September 24, 1946, to Johnson; 2,318,729, dated May 11, 1943, to Wilson; and 2,364,178, dated December 5, 1944, to Wilson.

In some instances amines having 10, 12, 15 or 20 basic nitrogen atoms are obtained by merely treating amines of the type described elsewhere, such as the polyethylene amines of ethylene imine. In a few cases an unsaturated group may be present; see U. S. Patents No. 2,440,724 dated May 4, 1948, to Morey, and 2,441,669, dated May 18, 1948, to Morey.

In some cases amines which otherwise qualify, except in the matter of water-solubility, may be treated with one of the alkylene oxide previously mentioned which is ethylene oxide, or glycide, or with ethylene imine or a combination so as to yield a suitable initial raw material. See, for instance, the table found on page 2 of U. S. Patent No. 2,393,825, dated January 29, 1946, to Senkus. See also certain amines described in U. S. Patent No. 2,262,357, dated November 11, 1941, to De Groote. Note the suitable amines depicted and described in U. S. Patent No. 2,391,830, dated December 25, 1945, to Jayne et al., which include, among others, the following: Hydroxy ethyl ethylene diamine; 1,2-di-(2'-ethanolamino)-ethane; 1,2 - di - (2',3'-propan-diol-amino) - ethane; 1,3-di-(2'-ethanolamino)-2-propanol; N-1',2'-diamino - propylamino - 2 - ethanol; 1,2-di-(ethanolamino) - 3 - aminopropane; 1,2,3-tri-(ethanolamino)-propane; tri-(mono-methylamino-methyl)-ethanol; and 1,2 - di - (4'-cyclohexanolamino)-ethane.

Other suitable amines are described in U. S. Patent No. 2,046,720, dated July 7, 1936, to Bottoms, which were the following: N-(2-hydroxy-3-amino propyl)-ethylene diamine-1,2; N-dimethyl-N'-(2-hydroxy-3-amino propyl)-ethylene diamine - 1,2; N-N'-diethyl-N'-(2-hydroxy-3-amino propyl)-ethylene diamine-1,2; N-(2-hydroxy-3-amino propyl)-N'-(2,3-dihydroxy - 4 - aminobutyl)-ethylene diamine - 1,2; N - (2 - hydroxy-3-amino propyl)-2-hydroxy propylene diamine-1,3; and N,N'-di(2-hydroxy-3-amino propyl)-2-hydroxyl propylene diamine-1,3.

Where propylene or butylene dichloride is used for reaction with ammonia to yield amines, the chlorine atoms may be attached to two adjacent carbon atoms. The result is that such amines have a carbon atom chain substituted by a methyl or ethyl group. Where glycerol monochlorohydrin, or glycerol dichlorohydrin, is used for reaction with ammonia or the like to produce amines, one or more carbon atoms may be substituted by a hydroxyl radical. Similarly, a carbon atom may have an oxygen atom attached thereto. Reference is made to U. S. Patent No. 2,262,358, dated November 11, 1941, to De Groote. Note the description of the following amines:

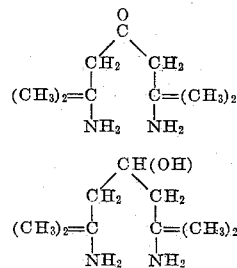

(See German Patent No. 96,657, March 1, 1898.)

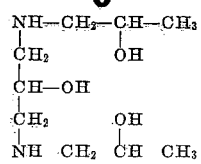

(See German Patent No. 635,904, to I. G. Farbenindustrie, A.-G., dated October 1, 1946.)

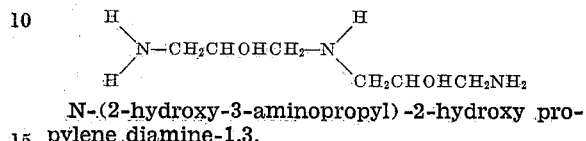

N-(2-hydroxy-3-aminopropyl)-2-hydroxy propylene diamine-1,3.

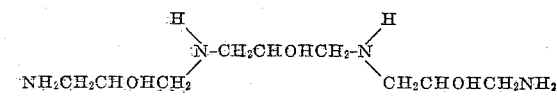

N,N'-di(2-hydroxy-3-aminopropyl)-2-hydroxy propylene diamine-1,3.

A variety of other suitable amines are described in the following patents: U. S. Patent No. 2,048,990, dated July 28, 1936, to Britton et al.; U. S. Patent No. 2,149,273, dated March 7, 1939, to Carothers; U. S. Patent No. 1,790,042, dated January 27, 1931, to Eisleb; U. S. Patent No. 2,246,524, dated June 24, 1941, to Kyrides; U. S. Patent No. 2,368,521, dated January 30, 1945, to Clifford, et al.; and U. S. Patent No. 2,368,968, dated February 6, 1945, to Christmann.

As to the preparation of a variety of suitable polyamines using ethylene imine, see U. S. Patent No. 2,318,729, dated May 11, 1943, to Wilson.

PART 2

The oxypropylation procedure employed in the preparation of derivatives from polyamino reactants has been uniformly the same, particularly in the light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge; manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range, for instance, in most cases I have selected a point of approximately 160° to 165° C., as being particularly desirable and stayed within the range of 155° to 180° almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam, in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment. As an illustration of such oxypropylation procedure the following examples are included.

*Example A*

The polyamino reactant employed was tetraethylene pentamine. This material is available as an amber colored liquid. In the oxypropylation of polyamino compounds having one or more basic nitrogen atom it is not necessary, at least in the early stage, to add an alkline catalyst such as sodium methylate, caustic soda, caustic potash, etc. In fact, the reaction takes place with comparative speed as illustrated by the initial step of oxyproplyation.

In this experiment 379 grams of tetraethylenepentamine were placed in the autoclave after flushing out with nitrogen. The bomb reservoir served as a holder for propylene oxide (which has been described previously) and was charged with more than 1800 grams of propylene oxide so that 1740 grams could be withdrawn by difference and noted on the scale. It is inconvenient to attempt to withdraw all the propylene oxide from the bomb reservoir for the reason that the exit tube does not go to the very bottom of the bomb. In this particular experiment the stirring speed employed was approximately 300 R. P. M. The temperature in the autoclave was raised to 150° C. before any oxide was added. In the instant series of experiments the products were invariably liquids and there was no difficulty in subsequent steps if the addition of sodium methylate was required as stirring would distribute or dissolve the catalyst. Before starting the experiment a range of 150° to 180° C. was selected. Subsequent control of valves, reactor inlet, cooling water, steam, etc., are intended to keep the experiment within this range. When the temperature reached 150° C., and the catalyst was thoroughly dissolved as noted, propylene oxide was forced in using nitrogen pressure on the reservoir bomb. The pressure during the addition of the propylene oxide stayed comparatively low for the reason that the reaction was instant and there was no opportunity for unreacted propylene oxide to heat up and show pressure. The actual gauge pressure was approximately 55 pounds, or less.

The nitrogen pressure on the propylene oxide reservoir was 100 pounds which meant that due to the conventional check gauge arrangement propylene oxide could not be forced into the autoclave for reaction if at any time the pressure in the reactor moved about 100 pounds gauge pressure. In actual operation the 1740 grams of propylene oxide were added in approximately ½ hour and at no time did the pressure go higher than 55 pounds, and the reaction operated smoothly; at no time did it go past the preselected maximum point at 180° C. The bulk of the reaction took place at a range of 160° to 170° C. It will be noted that the amount of propylene oxide added was approximately 15 moles of propylene oxide for each mole of tetraethylenepentamine; or, stated another way, 2.5 moles of propylene oxide for each reactive hydrogen atom. This product still showed water-solubility. The product was prepared essentially to be used as an intermediate product for further oxypropylation, as described in subsequent steps.

*Example B*

530 grams of the intermediate described in Example A, preceding (representing approximately 95 grams of tetraethylenepentamine and 435 grams of propylene oxide) were reacted with 1160 grams of propylene oxide without the addition of any catalyst. For practical purposes the operating conditions as to pressure, temperature, etc., were the same as in Example A, preceding. Since no catalyst was added and since alkalinity had been reduced the time required was somewhat longer, approximately 2 hours. This particular product represented a molal range of 55 moles of propylene oxide per mole of tetraethylenepentamine, or approximately 8 moles of propylene oxide per reactive hydrogen atom. The final product obtained represented 95 grams of tetraethylenepentamine plus 1595 grams of propylene oxide. The molecular weight was in the neighborhood of 3400.

*Example C*

The initial reactant was 845 grams of the intermediate of Example B, immediately preceding. This represented 47.5 grams of tetraethylenepentamine, and 798 grams of propylene oxide. This polyamino reactant was combined with 1160 grams of propylene oxide, after adding 25 grams of sodium methylate as a catalyst. Note that no catalyst was added until this third stage. There would have been no objection, of course, to adding some catalyst to the second stage to speed up the reaction, if required.

The conditions of operation were substantially the same as in Example A, preceding. The end product in this instance showed distinct water-insolubility. It is to be noted that this particular product represented a molal ratio of approximately 135 moles of propylene oxide per mole of tetraethylenepentamine, or approximately 19 moles of propylene oxide per reactive hydrogen atom. The final product represented 47.5 grams of tetraethylenepentamine in combination with 1958 grams of propylene oxide, or little less than 5% of tetraethylenepentamine combined with a little more than 95° of propylene oxide. This product was an excellent demulsifier for a number of Gulf Coast oils produced in the neighborhood of Beaumont, Texas.

*Example D*

The initial reactant was 1,000 grams of Example C, preceding. This represented a little less than 24 grams of tetraethylenepentamine and a little more than 976 grams of propylene oxide. No additional catalyst was added but this product was treated with 580 grams of propylene oxide under substantially the same conditions as noted in Example A, preceding. Propylene oxide was added in 1½ hours.

This product yielded 1580 grams of the material in which the molal ratio of propylene oxide to polyamine was 215 to 1, and represented approximately 24 grams of tetraethylenepentamine and 1556 grams of propylene oxide.

*Example E*

The previous example, Example D, was split in two again and one-half the sample, or 790 grams, were treated with 4 moles of propylene oxide, or 232 grams. The initial sample represented 12 grams of tetraethylenepentamine and 778 grams of propylene oxide. 5 grams of sodium methylate were added prior to oxypropylation to speed up the reaction. The conditions of oxypropylation were substantially the same as in Example A, except that the time was comparatively shorter due to the small amount of propylene oxide added, being about 20 minutes.

The yield was about 1022 grams of product in which the ratio of propylene oxide to tetraethylenepentamine was 279 to 1. This product represented 12 grams of tetraethylenepentamine and 1010 grams of propylene oxide. It will be noted that at this proportion the ratio was in the neighborhood of 1% tetraethylenepentamine and 99% propylene oxide.

*Example F*

The entire yield of the previous example, Example E, to wit, 1022 grams, were treated with 2 moles of propylene oxide (116 grams) without addition of any more catalyst. The operating conditions were the same as before except that the time was comparatively shorter, being about 20 minutes, due to the small amount of propylene oxide added.

In the final product the molal ratio was approximately 311 to 1, and the amine represented about 1% of the final product, assuming complete reaction. All the various products obtained from polyamines or their derivatives, gave liquids varying from those having a viscosity in some instance like castor oil or blown castor oil, down to glycerol or polypropylene glycol, or the like. The color varied from a deep reddish amber to a light amber, or pale reddish straw color. Color seemed to be due to the nitrogenous compounds, or a trace of decomposition products, or possibly a trace of metal obtained from the reaction vessel. These products can be decolorized in the usual way with charcoal, clay, or the like. When exposed to sunlight they seem to darken again. For most purposes herein described and particularly as demulsifiers, such color is not significant and no particular attempt was made to control color.

*Example G*

The same procedure was employed as in the six examples preceding, but triethylenetetramine was substituted for tetraethylenepentamine. The operating conditions were substantially the same and the same molal ratios and same allocable proportions were taken at each stage. The resultant products were all similar to those obtained in Examples A to F, preceding, and water-insolubility seemed to appear in molecular weight range of 5,000 or thereabouts. On the emulsions previously referred to obtained from the vicinity of Beaumont, Texas, these particular products were not quite as good as those derived from tetraethylenepentamine.

It will be noted that some of the reactants referred to in the subsequent tables of further examples were obtained by reaction of glycide on selected polyamino reactants. Attention is directed to the fact that the use of glycide requires extreme caution. This is particularly true on any scale other than small laboratory or semipilot plant operations. Purely from the standpoint of safety in the handling of glycide, attention is directed to the following: (a) If prepared from glycerol monochlorohydrin this product should be comparatively pure; (b) the glycide itself should be as pure as possible, as the effects of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the co-pending application of Melvin De Groote and Bernhard Keiser, Serial No. 82,704, filed March 21, 1949 (now Patent No. 2,499,370, dated March 7, 1950), and offered for sale by numerous laboratory supply houses. If such arrangement is used to prepare laboratory scale duplications, then care should be taken that the heating mantle can be removed rapidly so as to allow for cooling; or better still, through an added opening at the top of the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this section; but in any event, when the initial amount of glycide is added to a suitable reactant, the speed of reaction should be controlled by the usual factors, such as (a) the rate of addition of glycide; (b) the elimination of external heat, and (c) use of cooling coil so there is no undue rise in temperature. All the foregoing is merely conventional but is included due to the hazard in handling glycide.

TABLE 1

| Example No. | Polyhydric Chemical Compound, or Prior Derivative | Molec. Wt. | No. of Reactive Hydrogen Atoms | Amt. gms. | Amt. of Sod. Meth. Added if any | Amt. of Propylene Oxide Added gms. | Molal Ratio per Initial Molecule | Molal Ratio per Initial Reactive Hydrogen Atom | Molec Wt. of Derivative |
|---|---|---|---|---|---|---|---|---|---|
| 1 | HB Polyamine [1] | 275 | 9 | 275 | None | 1,160 | 20:1 | 2.2 | 1,435 |
| 2 | Monoglycerol ether of tetraethylenepentamine [2] | 263 | 8 | 263 | ...do... | 1,160 | 20:1 | 2.5 | 1,423 |
| 3 | Diglycerol ether of tetraethylenepentamine [3] | 337 | 9 | 337 | ...do... | 1,160 | 20:1 | 2.2 | 1,497 |
| 4 | Triglycerol ether of tetraethylenepentamine [4] | 411 | 10 | 411 | ...do... | 1,160 | 20:1 | 2.0 | 1,571 |
| 5 | Monoglycerol ether of HB amine [5] | 349 | 10 | 349 | ...do... | 1,160 | 20:1 | 2.0 | 1,509 |
| 6 | Diglycerol ether of HB amine [6] | 423 | 11 | 423 | ...do... | 1,160 | 20:1 | 1.9 | 1,583 |
| 7 | Triglycerol ether of HB amine [7] | 497 | 12 | 497 | ...do... | 1,160 | 20:1 | 1.8 | 1,657 |
| 8 | Monoethyleneglycol ether of Tetraethylene pentamine [8] | 233 | 7 | 233 | ...do... | 1,160 | 20:1 | 3 | 1,393 |
| 9 | Diethyleneglycolether of Tetraethylene pentamine [9] | 277 | 7 | 277 | ...do... | 1,160 | 20:1 | 3 | 1,437 |
| 10 | Hydroxyethyl ethylenediamine | 104 | 4 | 104 | ...do... | 1,160 | 20:1 | 5 | 1,264 |
| 11 | Propylene diamine | 74 | 4 | 74 | ...do... | 1,160 | 20:1 | 5 | 1,234 |
| 12 | Dipropylene triamine | 131 | 5 | 131 | ...do... | 1,160 | 20:1 | 4 | 1,291 |
| 13 | Monoacetyl derivative of Tetraethylene pentamine | 231 | 6 | 231 | ...do... | 1,160 | 20:1 | 3.3 | 1,391 |
| 14 | Reaction product of propylene diamine (1 mole) and ethylene imine (2 moles) | 150 | 6 | 150 | ...do... | 1,160 | 20:1 | 3.3 | 1,310 |
| 15 | Reaction product of dipropylene triamine (1 mole) and ethylene imine (2 moles) | 217 | 7 | 217 | ...do... | 1,160 | 20:1 | 3 | 1,377 |
| 16 | Reaction product of tetraethylene pentamine (1 mole) and ethylene imine (5 moles) | 404 | 12 | 404 | ...do... | 1,160 | 20:1 | 1.8 | 1,564 |

[1] HB amine is the trade name for a high boiling polyamine residue remaining after the distillation of tetraethylenepentamine. It is undoubtedly a mixture of the immediately higher homologues of tetraethylenepentamine, and the above value of 275 molecular weight is an approximation corresponding roughly to hexaethylene heptamine.
[2] Obtained by reaction of one mole of glycide and one mole of tetraethylenepentamine.
[3] Obtained by reaction between 2 moles of glycide and one mole of tetraethylenepentamine.
[4] Obtained by reaction between 3 moles of glycide and one mole of tetraethylenepentamine.
[5] Obtained from high boiling polyamine previously described and glycide in equal molar ratio.
[6] Obtained from high boiling polyamine (1 mole) and glycide (2 moles).
[7] Obtained from high boiling polyamine (1 mole) and glycide (3 moles).
[8] Obtained by reacting one mole of ethylene oxide with one mole of tetraethylenepentamine.
[9] Obtained by reacting one mole of tetraethylenepentamine with 2 moles of ethylene oxide.

TABLE 2

| Example No. | Polyhydric Chemical Compound or Prior Derivative | Molec. Wt. | No. of Reactive Hydrogen Atoms | Amt., gms. | Amt. of Sod. Meth. Added if any, gms. | Amt. of Propylene Oxide Added, gms. | Molal Ratio per Initial Molecule | Molec. Wt. of Derivative |
|---|---|---|---|---|---|---|---|---|
| 17 | 1 | 1,435 | 9 | 718 | None | 1,160 | 40:1 | 3,755 |
| 18 | 2 | 1,423 | 8 | 712 | ...do... | 1,160 | 40:1 | 3,743 |
| 19 | 3 | 1,497 | 9 | 749 | ...do... | 1,160 | 40:1 | 3,817 |
| 20 | 4 | 1,571 | 10 | 785 | ...do... | 1,160 | 40:1 | 3,891 |
| 21 | 5 | 1,509 | 10 | 755 | ...do... | 1,160 | 40:1 | 3,829 |
| 22 | 6 | 1,583 | 11 | 792 | ...do... | 1,160 | 40:1 | 3,903 |
| 23 | 7 | 1,657 | 12 | 829 | ...do... | 1,160 | 40:1 | 3,977 |
| 24 | 8 | 1,393 | 7 | 697 | ...do... | 1,160 | 40:1 | 3,713 |
| 25 | 9 | 1,437 | 7 | 719 | ...do... | 1,160 | 40:1 | 3,757 |
| 26 | 10 | 1,264 | 4 | 632 | ...do... | 1,160 | 40:1 | 3,584 |
| 27 | 11 | 1,234 | 4 | 617 | ...do... | 1,160 | 40:1 | 3,554 |
| 28 | 12 | 1,291 | 5 | 646 | ...do... | 1,160 | 40:1 | 3,611 |
| 29 | 13 | 1,391 | 6 | 696 | ...do... | 1,160 | 40:1 | 3,711 |
| 30 | 14 | 1,310 | 6 | 655 | ...do... | 1,160 | 40:1 | 3,630 |
| 31 | 15 | 1,377 | 7 | 689 | ...do... | 1,160 | 40:1 | 3,797 |
| 32 | 16 | 1,564 | 12 | 782 | ...do... | 1,160 | 40:1 | 3,884 |

TABLE 3

| Example No. | Polyhydric Chemical Compound or Prior Derivative | Molec. Wt. | No. of Reactive Hydrogen Atoms | Amt., gms. | Amt. of Sod. Meth. Added if any, gms. | Amt. of Propylene Oxide Added, gms. | Molal Ratio per Initial Molecule | Molec. Wt. of Derivative | Water Solubility |
|---|---|---|---|---|---|---|---|---|---|
| 33 | 17 | 3,755 | 9 | 751 | 15 | 580 | 90:1 | 6,655 | No |
| 34 | 18 | 3,743 | 8 | 748 | 15 | 580 | 90:1 | 6,643 | No |
| 35 | 19 | 3,817 | 9 | 765 | 15 | 580 | 90:1 | 6,717 | No |
| 36 | 20 | 3,891 | 10 | 778 | 15 | 580 | 90:1 | 6,791 | No |
| 37 | 21 | 3,829 | 10 | 766 | 15 | 580 | 90:1 | 6,729 | No |
| 38 | 22 | 3,903 | 11 | 781 | 15 | 580 | 90:1 | 6,803 | No |
| 39 | 23 | 3,977 | 12 | 795 | 15 | 580 | 90:1 | 6,877 | No |
| 40 | 24 | 3,713 | 7 | 745 | 15 | 580 | 90:1 | 6,613 | No |
| 41 | 25 | 3,757 | 7 | 751 | 15 | 580 | 90:1 | 6,657 | No |
| 42 | 26 | 3,584 | 4 | 717 | 15 | 580 | 90:1 | 6,484 | No |
| 43 | 27 | 3,554 | 4 | 711 | 15 | 580 | 90:1 | 6,454 | No |
| 44 | 28 | 3,611 | 5 | 722 | 15 | 580 | 90:1 | 6,511 | No |
| 45 | 29 | 3,711 | 6 | 742 | 15 | 580 | 90:1 | 6,611 | No |
| 46 | 30 | 3,630 | 6 | 726 | 15 | 580 | 90:1 | 6,530 | No |
| 47 | 31 | 3,797 | 7 | 759 | 15 | 580 | 90:1 | 6,697 | No |
| 48 | 32 | 3,884 | 12 | 777 | 15 | 580 | 90:1 | 6,784 | No |

TABLE 4

| Example No. | Polyhydric Chemical Compound or Prior Derivative | Molec. Wt. | No. of Reactive Hydrogen Atoms | Amt., gms. | Amt. of Sod. Meth. Added if any, gms. | Amt. of Propylene Oxide Added, gms. | Molal Ratio per Initial Molecule | Molec. Wt. of Derivative | Water Solubility |
|---|---|---|---|---|---|---|---|---|---|
| 49 | 33 | 6,655 | 9 | 1,331 | None | 580 | 140:1 | 9,555 | No |
| 50 | 34 | 6,643 | 8 | 1,328 | do | 580 | 140:1 | 9,543 | No |
| 51 | 35 | 6,717 | 9 | 1,345 | do | 580 | 140:1 | 9,617 | No |
| 52 | 36 | 6,791 | 10 | 1,358 | do | 580 | 140:1 | 9,691 | No |
| 53 | 37 | 6,729 | 10 | 1,346 | do | 580 | 140:1 | 9,629 | No |
| 54 | 38 | 6,803 | 11 | 1,361 | do | 580 | 140:1 | 9,703 | No |
| 55 | 39 | 6,877 | 12 | 1,375 | do | 580 | 140:1 | 9,777 | No |
| 56 | 40 | 6,613 | 7 | 1,325 | do | 580 | 140:1 | 9,513 | No |
| 57 | 41 | 6,657 | 7 | 1,331 | do | 580 | 140:1 | 9,557 | No |
| 58 | 42 | 6,484 | 4 | 1,297 | do | 580 | 140:1 | 9,384 | No |
| 59 | 43 | 6,454 | 4 | 1,291 | do | 580 | 140:1 | 9,354 | No |
| 60 | 44 | 6,511 | 5 | 1,302 | do | 580 | 140:1 | 9,411 | No |
| 61 | 45 | 6,611 | 6 | 1,322 | do | 580 | 140:1 | 9,511 | No |
| 62 | 46 | 6,530 | 6 | 1,306 | do | 580 | 140:1 | 9,430 | No |
| 63 | 47 | 6,697 | 7 | 1,339 | do | 580 | 140:1 | 9,597 | No |
| 64 | 48 | 6,784 | 12 | 1,359 | do | 580 | 140:1 | 9,684 | No |

TABLE 5

| Example No. | Polyhydric Chemical Compound or Prior Derivative | Molec. Wt. | No. of Reactive Hydrogen Atoms | Amt., gms. | Amt. of Sod. Meth. Added if any, gms. | Amt. of Propylene Oxide Added, gms. | Molal Ratio per Initial Molecule | Molec. Wt. of Derivative | Water Solubility |
|---|---|---|---|---|---|---|---|---|---|
| 65 | 49 | 9,555 | 9 | 1,911 | 5 | 580 | 190:1 | 12,455 | No |
| 66 | 50 | 9,543 | 8 | 1,908 | 5 | 580 | 190:1 | 12,443 | No |
| 67 | 51 | 9,617 | 9 | 1,925 | 5 | 580 | 190:1 | 12,517 | No |
| 68 | 52 | 9,691 | 10 | 1,938 | 5 | 580 | 190:1 | 12,591 | No |
| 69 | 53 | 9,629 | 10 | 1,926 | 5 | 580 | 190:1 | 12,529 | No |
| 70 | 54 | 9,703 | 11 | 1,941 | 5 | 580 | 190:1 | 12,603 | No |
| 71 | 55 | 9,777 | 12 | 1,955 | 5 | 580 | 190:1 | 12,677 | No |
| 72 | 56 | 9,513 | 7 | 1,905 | 5 | 580 | 190:1 | 12,413 | No |
| 73 | 57 | 9,557 | 7 | 1,911 | 5 | 580 | 190:1 | 12,457 | No |
| 74 | 58 | 9,384 | 4 | 1,877 | 5 | 580 | 190:1 | 12,284 | No |
| 75 | 59 | 9,354 | 4 | 1,871 | 5 | 580 | 190:1 | 12,254 | No |
| 76 | 60 | 9,411 | 5 | 1,882 | 5 | 580 | 190:1 | 12,311 | No |
| 77 | 61 | 9,511 | 6 | 1,902 | 5 | 580 | 190:1 | 12,411 | No |
| 78 | 62 | 9,430 | 6 | 1,886 | 5 | 580 | 190:1 | 12,330 | No |
| 79 | 63 | 9,597 | 7 | 1,919 | 5 | 580 | 190:1 | 12,497 | No |
| 80 | 64 | 9,684 | 12 | 1,937 | 5 | 580 | 190:1 | 12,584 | No |

In order to illustrate why the herein specified compounds or products are cogeneric mixtures and not single chemical compounds and why they must be described in terms of manufacture and molal ratio or percentage of reactants, reference is made to a monohydric alcohol or a secondary amine having a single reactive aminohydrogen atom. Needless to say, after the first mole of propylene oxide reacts with such amine the aminohydrogen atom is replaced by an alkanol radical. One of the simplest compounds herein contemplated as an initial reactant is ethylenediamine or hydroxyethyl ethylenediamine. In either instance there are at least 4 reactive hydrogen atoms. Other examples appearing elsewhere herein may have a dozen or more reactive hydrogen atoms as in the case of a mole of tetraethylenepentamine which has been treated with 7 moles of glycide. However, one need only consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide it is well known that one does not obtain a single constituent which, for sake of convenience may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many, many times in the case of a tetrahydric compound and a hexahydric compound, or one having even a larger number of hydroxyls. This is particularly true when enough propylene oxide is added to give, at least on a statistical basis, assuming complete reaction, a compound having a molecular weight within the range previously specified.

Basically, the compounds herein described owe their peculiar properties to a number of factors previously enumerated, at least in part: (a) size of molecule; (b) shape of molecule as far as space configuration goes; (c) absence of a single hydrophobe group having as many as 8 uninterrupted carbon atoms in a single radical; (d) substantial insolubility in water; and (e) such combination being obtained by the action of propylene oxide alone for all practical purposes.

Actually it can be seen that certain variations could be made without detracting from the spirit of the invention as, for example, one could start with a material such as tetraethylenepentamine and treat this polyamine with approximately 50 moles of propylene oxide and then with 7 moles of glycide, and then with another 50 moles of propylene oxide. Actually, if 7 moles of glycide went on at the end of the intermediate structure and oxypropylation has resulted, the only thing that would happen is that there would be 14 terminal groups instead of 7. If one started with triethylenetetramine and followed the same procedure there would be 12 instead of 6 terminal groups.

Actually, the introduction or interruption of a propylene oxide chain by a glycide radical obviously does not depart from this invention and is included within the expression "oxypropylation" for reasons which require no further explanation. The same thing is true if at some stage in oxypropylation one injected one or two ethylene radicals which would not offset other factors which complete the overall structure, such as molecular size, insolubility in water, etc. If one used a mole of butylene oxide for each polyamine again one would get the same effect for the reason that the overall picture has not been changed and there is no departure from the spirit of the invention. For that matter, one might use a few moles of ethylene oxide and a few moles of butylene oxide.

Basically, a comparatively simple low molal water-soluble polyamine of the kind specified is transformed into a high molal water-insoluble compound having a molecular weight of several thousand up to 25,000 or 30,000, and such insolubility is brought about substantially by the use of propylene oxide alone. The preferred range of molecular weight is in the neighborhood of 4,000 or thereabouts, to 14,000 or thereabouts.

It is to be noted that somewhat analogous products can be derived from other amines, either monoamines or polyamines. For instance, monoamines such as triethanolamine, tripropanolamine, tributanolamine, or the like, can be treated with propylene oxide as such, or such amines can be reacted first with glycide so as to increase the number of reactive hydrogen atoms and then treated with propylene oxide.

Another class of amines are those in which the carbon atom chain linking two or more nitrogen atoms is invariably interrupted by an oxygen atom. Examples of such amines are those obtained by the action of dichloroethylether on ammonia, or other amines in the same manner as when ethylene dichloride is used. The amines so produced, of course, show the typical oxygen interrupted carbon atom chain between the nitrogen atoms. Other similar compounds are obtained by heating triethanolamine, tripropanolamine, tributanolamine, or the like, so as to form ether linkages. Such amines can, of course, be treated with alkylene oxides, and then caused to etherize so as to lengthen the chain between the nitrogen atoms. Similar amines are obtained by the action of ethylene imine on hydroxylated compounds such as glycerol, diglycerol, etc. In other instances polyamines may show both types of linkages, (a) carbon atom chains without interruption by oxygen atoms, and (b) carbon atom chains interrupted by oxygen atoms. For instance, ethylenediamine, triethylenetetramine, or tetraethylenepentamine may be treated with ethylene oxide, or some other alkylene oxide, and then heated so as to cause ether formation. These compounds illustrate products having both types of linkages. Needless to say, from all these various amines one can prepare the same derivatives which bear a simple genetic relationship to the original amine except those pointed out in the earlier text of the instant invention.

It is desired to emphasize the fact that the instant invention is limited to a comparatively narrow range of materials which must have at least two or more nitrogen atoms, of which at least one must be basic; such nitrogen atoms must be connected exclusively by a carbon atom chain as differentiated from other possible linkages such as those described immediately preceding.

As far as a preferred class of materials is concerned it is my preference to use those most readily available, such as the polyethyleneamines and the polypropyleneamines. I prefer to use them without modification so as to convert them into any derivative. My preference simply is to treat with propylene oxide and to obtain a molecular weight range somewhere in the neighborhood of 4,000 to 10,000. As far as I am aware at this time the three most desirable initial reagents are tetraethylenepentamine, pentaethylenehexamine, and hexaethyleneheptamine. The last two of these are best available as constituents of the high boiling polyethyleneamine residue previously referred to.

However, without any reservation as to immediate availability in the open market I would select the same higher alkylene polyamines which had been treated with glycide in the ratio of at least one mole of glycide per reactive hydrogen, as an outstanding reactant for combination with propylene oxide. In fact, such oxypropylated derivatives are so outstanding that they represent an invention within an invention.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agents of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000, as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline oil or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example C, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, a mixture which exemplifies such combination is the following:

Oxypropylated derivative, for example, the product described as Example C, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Having thus described my invention, what I claim as new and desire to secure by Letters Patent, is:

1. A process for breaking petroleum emulsions of the water-in-oil type characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 1800 and at least a plurality of reactive hydrogen atoms; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial polyamino reactant; (j) the polyamino reactant must contain at least one basic nitrogen atom; and (k) the nitrogen atoms are linked by a carbon atom chain.

2. A process for breaking petroleum emulsions of the water-in-oil type characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 1800 and at least a plurality of reactive hydrogen atoms; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial polyamino reactant; (j) the polyamino reactant must contain at least a plurality of basic nitrogen atoms; and (k) the nitrogen atoms are linked by a carbon atom chain.

3. The process of claim 2 with the proviso that the polyamino compound be a polyalkylene amino compound.

4. The process of claim 2 with the proviso that the polyamino compound be a polyethylene amino compound.

5. The process of claim 2 with the proviso that the polyamino compound be a polyethylene amino compound, and with the further proviso that the molecular weight range be within the ratio of 4,000 to 10,000.

6. The process of claim 2 with the proviso that the polyamino compound is triethylenetetramine, and with the further proviso that the molecular weight range be within the ratio of 4,000 to 10,000.

7. The process of claim 2 with the proviso that the polyamino compound is tetraethylenepentamine, and with the further proviso that the molecular weight range be within the ratio of 4,000 to 10,000.

8. The process of claim 2 with the proviso that the polyamino compound is a high boiling residual polyethylene amino compound having more than 5 nitrogen atoms per molecule, and with the further proviso that the molecular weight range be within the ratio of 4,000 to 10,000.

MELVIN DE GROOTE.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,243,329 | De Groote et al. | May 27, 1941 |
| 2,262,358 | De Groote et al. | Nov. 11, 1941 |
| 2,262,736 | De Groote et al. | Nov. 11, 1941 |
| 2,262,743 | De Groote et al. | Nov. 11, 1941 |
| 2,290,154 | Blair | July 21, 1942 |